Patented Aug. 18, 1953

2,649,440

UNITED STATES PATENT OFFICE 2,649,440

2,4 - BIS (METHYLSULFONYL) -BENZENEAZO-N - HYDROXYALKYL-N - β-CYANOETHYL-ANILINE COMPOUNDS

Joseph B. Dickey and George J. Taylor, Kingsport, Tenn., assignors to Eastman Kodak Company, Rochester, N. Y., a corporation of New Jersey No Drawing. Application June 30, 1951,
Serial No. 234,682

6 Claims. (Cl. 260—207.5)

1

This invention relates to new azo compounds and their application to the art of dyeing or coloring.

We have discovered that the azo compounds having the general formula:

I

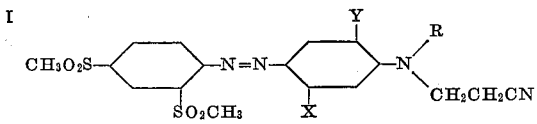

wherein R represents a β-hydroxyethyl group, a γ-hydroxypropyl group, a β,γ-dihydroxypropyl group, a β-sulfatoethyl group, a γ-sulfatopropyl group or a sulfated β,γ-dihydroxypropyl group, X represents a hydrogen atom, a chlorine atom, a bromine atom or a methyl group and Y represents a hydrogen atom, a methoxy group, an ethoxy group or a β-hydroxyethoxy group are valuable dyes for coloring textile materials made of or containing a cellulose alkyl carboxylic acid ester having 2 to 4 carbon atoms in the acid groups thereof. They are particularly of use for the coloration of cellulose acetate textile materials. They color the aforesaid textile materials orange to rubine shades which have good to excellent fastness to light and gas. Those compounds containing a sulfato group also have utility for the dyeing of silk, wool, polyethylene terephthalate and modified polyacrylonitrile textile materials. Because of the increased water solubility of the new sulfato azo dye compounds, they are particularly adapted for dyeing cones of yarn and fabrics of close weave and of heavy construction.

It is an object of our invention to provide new azo compounds. Another object is to provide a satisfactory process for the preparation of the new azo compounds of the invention. A further object is to provide dyed cellulose alkyl carboxylic acid ester textile materials which possess excellent fastness to light and gas. A particular object is to provide new azo compounds which are especially of value for the dyeing of cellulose acetate textile materials.

By cellulose alkyl carboxylic acid esters having two to four carbon atoms in the acid groups thereof, we means to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing 2,4-bis(methylsulfonyl)-

2 aniline and coupling the diazonium compound obtained with a compound having the formula:

II

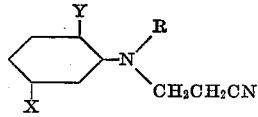

R, X and Y in the foregoing formula have the meaning previously assigned to them. The new sulfato azo compounds are also prepared by introducing a sulfato group into the azo compounds of our invention not containing a sulfato group.

The following examples illustrate the azo compounds of our invention and their manner of preparation.

EXAMPLE 1

A. Nitrosyl sulfuric acid 7.6 grams of dry sodium nitrite were added, with stirring, to 92 grams of sulfuric acid (sp. gr. 1.84) while keeping the temperature below 70° C. The resulting solution was then cooled to 5° C.–10° C. and 100 grams of acetic acid were added dropwise, with stirring, while maintaining the temperature at 5° C.–10° C.

B. Diazotization 24.9 grams of 2,4-bis(methylsulfonyl)-aniline were added slowly, with stirring, to the nitrosyl sulfuric acid prepared as described above while keeping the temperature below 20° C. Then, 100 grams of acetic acid were added dropwise, with stirring, at a temperature between 15° C.–20° C. and stirring was continued until all the 2,4-bis-(methylsulfonyl)-aniline had dissolved and diazotization was complete. The diazonium solution thus formed was then poured onto 500 grams of crushed ice and enough urea was added to destroy the excess nitrous acid. The diazonium solution should be clear and free of suspended undiazotized amine.

C. Coupling 19 grams of N-β-hydroxyethyl-N-β-cyanoethylaniline were dissolved in 200 cc. of ice and water containing 15 cc. of hydrochloric acid (sp. gr. 1.16) and the diazonium solution prepared as described in B was then added slowly, with stirring. The coupling reaction which takes place was completed by adding just sufficient sodium carbonate to neutralize the acid present in the reaction mixture. The sodium carbonate was added portionwise. The dye compound formed was recovered by filtration, washed well with water and dried. It has the formula:

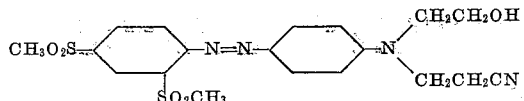

and colors cellulose acetate textile materials orange shades.

EXAMPLE 2

24.9 grams of 2,4-bis(methylsulfonyl)-aniline were diazotized and the diazonium compound obtained was coupled with 22.4 grams of N-β-hydroxyethyl - N - β - cyanoethyl-m-chloroaniline. Diazotization, coupling and recovery of the dye compound formed were carried out in accordance with the procedure described in Example 1. The dye compound obtained colors cellulose acetate textile materials scarlet shades.

EXAMPLE 3

24.9 grams of 2,4-bis(methylsulfonyl)-aniline were diazotized and the diazonium compound obtained was coupled with 22 grams of N-β,γ-dihydroxypropyl-N-β-cyanoethylaniline. Diazotization, coupling and recovery of the dye compound formed were carried out in accordance with the procedure described in Example 1. The dye compound obtained colors cellulose acetate textile materials orange shades.

EXAMPLE 4

24.9 grams of 2,4-bis(methylsulfonyl)-aniline were diazotized and the diazonium compound obtained was coupled with 25.4 grams of N-β-hydroxyethyl - N - β - cyanoethyl - 2 - methoxy-5-chloroaniline. Diazotization, coupling and recovery of the dye compound formed were carried out in accordance with the procedure described in Example 1. The dye compound obtained colors cellulose acetate textile materials rubine shades.

EXAMPLE 5

24.9 grams of 2,4-bis(methylsulfonyl)-aniline were diazotized and the diazonium compound obtained was coupled with 20.4 grams of N-γ-hydroxypropyl - N - β - cyanoethylaniline. Diazotization, coupling and recovery of the dye compound formed were carried out in accordance with the procedure described in Example 1. The dye compound obtained colors cellulose acetate textile materials orange shades.

EXAMPLE 6

24.9 grams of 2,4-bis(methylsulfonyl)-aniline were diazotized and the diazonium compound obtained was coupled with 26.9 grams of N-β-hydroxyethyl - N - β - cyanoethyl-m-bromoaniline. Diazotization, coupling and recovery of the dye compound formed were carried out in accordance with the procedure described in Example 1. The dye compound obtained colors cellulose acetate textile materials scarlet shades.

EXAMPLE 7

24.9 grams of 2,4-bis(methylsulfonyl)-aniline were diazotized and the diazonium compound obtained was coupled with 20.4 grams of N-β-hydroxyethyl - N - β - cyanoethyl-m-toluidine. Diazotization, coupling and recovery of the dye compound formed were carried out in accordance with the procedure described in Example 1. The dye compound obtained colors cellulose acetate textile materials red shades.

EXAMPLE 8

45.1 grams of 2,4-bis(methylsulfonyl)-benzeneazo - N - β - hydroxyethyl - N - β - cyanoethylaniline (i. e. the dye compound of Example 1) were dissolved in 500 cc. of carbon tetrachloride and the resulting solution was cooled to 10° C. Then 12.7 grams of freshly distilled chlorosulfonic acid were added dropwise with stirring over a period of 3 hours. After the addition of the chlorosulfonic acid, the reaction mixture was slowly warmed to 50° C. and maintained at this temperature for several hours. Heating was then discontinued and the carbon tetrachloride was distilled off under reduced pressure. 300 cc. of ice and water were then added to the reaction mixture and the dye was recovered by evaporation. If a salt form of the dye is desired, the evaporation step is omitted. Instead, following the addition of the 300 cc. of ice and water, the reaction mixture is neutralized with sodium hydroxide (other suitable organic or inorganic bases can be used), warmed to dissolve the dye, filtered to remove any insoluble material and then concentrated under reduced pressure until the dye separates. The dye compound thus obtained has the formula:

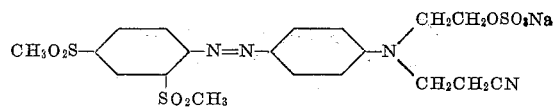

It colors the aforementioned textile materials orange shades.

EXAMPLE 9

46.5 grams of 2,4-bis(methylsulfonyl)-benzeneazo - N - γ -hydroxypropyl - N - β - cyanoethylaniline (i. e. the dye compound of Example 5) were dissolved in 200 cc. of pyridine and the resulting solution was cooled to 5° C. Then 12.7 grams of chlorosulfonic acid were added dropwise, with stirring, over a period of 3 hours. Stirring was continued for an additional 2 hours following which the reaction mixture was heated to 50° C. and maintained at this temperature for two hours. Following this the reaction mixture was cooled and the pyridine removed under reduced pressure. 300 cc. of ice and water were then added to the reaction mixture and the dye was recovered by evaporation. The dye compound obtained colors the aforesaid textile materials orange shades.

EXAMPLE 10

48.5 grams of 2,4-bis(methylsulfonyl)-benzeneazo - N - β - hydroxyethyl - N - β - cyanoethyl-m-chloroaniline (i. e. the dye compound of Example 2) were mixed with 50 cc. of sulfuric acid (sp. gr. 1.84) and the reaction mixture resulting was warmed to 50° C. for 3 hours and then cooled to 0° C. 200 cc. of ice and water were added and then the reaction mixture was made neutral to Congo red paper by the gradual addition of sodium bicarbonate. The dye compound formed was recovered by filtration and washed with a cold aqueous sodium chloride solution. The dye compound thus obtained colors the aforesaid materials scarlet shades.

EXAMPLE 11

24.9 grams of 2,4-bis(methylsulfonyl)-aniline were diazotized and the diazonium compound obtained was coupled with 35.7 grams of the sodium salt of N-β-sulfatoethyl-N-β-cyanoethyl-2-methoxy-5-chloroaniline. Diazotization, coupling and recovery of the dye compound formed was carried out in accordance with the procedure described in Example 1 except that the dye was washed with an aqueous sodium chloride solution rather than water. The dye compound obtained colors the textile materials mentioned hereinbefore rubine shades.

From the foregoing examples the manner of introducing a sulfato group is believed to be clear, especially since the manner of introducing a sulfato group is known to those skilled in the art. Any other suitable way of introducing the sulfato group into the dye molecule can be employed. The sulfato group can be present in its free acid form or in the form of an inorganic or organic base salt such as, for example, the Na, K, NH4, Mg, Ca, Li, methylamine, dimethylamine, trimethylamine, pyridine, aniline, guanidine, semicarbazide, biguanidine, phenyl guanidine, cyclohexylamine, dicyclohexylamine, tetrahydrofurfurylamine or alkanolamine salt form.

Other coupling compounds that are used in the preparation of the azo compounds of our invention include, for example, N-β,γ-dihydroxypropyl-N-β-cyanoethyl-m-chloroaniline, N-β,γ-dihydroxypropyl-N-β-cyanoethyl-m-toluidine, N-β,γ-dihydroxypropyl-N-β-cyanoethyl-2-methoxy-5-chloroaniline, N-β-hydroxyethyl-N-β-cyanoethyl-2-β-hydroxyethoxy-5-chloroaniline, N-β,γ-dihydroxypropyl-N-β-cyanoethyl-2-β-ethoxy-5-chloroaniline, N-β-hydroxyethyl-N-β-cyanoethyl-2-methoxy-5-bromoaniline, N-β-sulfatoethyl-N-β-cyanoethyl-m-bromoaniline, N-γ-sulfatopropyl-N-β-cyanoethyl-m-chloroaniline, N-γ-sulfatopropyl-N-β-cyanoethyl-2-methoxy-5-chloroaniline, sulfated N-β,γ-dihydroxypropyl-N-β-cyanoethylaniline, sulfated N-β,γ-dihydroxypropyl-N-β-cyanoethyl-m-chloroaniline and sulfated N-β,γ-dihydroxypropyl-N-β-cyanoethyl-2-methoxy-5-chloroaniline.

The new azo compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water. While an aqueous suspension has been referred to it will be understood that some of the dye goes into solution, and this is particularly so in the case of the sulfato dye compounds. Thus, the dye bath will contain dye in solution as well as in suspension.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The azo compounds having the general formula:

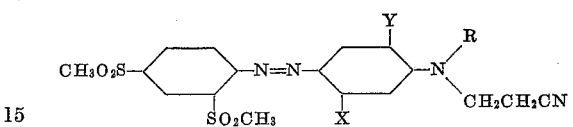

wherein R represents a member selected from the group consisting of a β-hydroxyethyl group, a γ-hydroxypropyl group, a β,γ-dihydroxypropyl group, a β-sulfatoethyl group, a γ-sulfatopropyl group and a sulfated β,γ-dihydroxypropyl group, X represents a member selected from the group consisting of a hydrogen atom, a chlorine atom, a bromine atom and a methyl group and Y represents a member selected from the group consisting a hydrogen atom, a methoxy group, an ethoxy group and a β-hydroxyethoxy group.

2. The azo compound having the formula:

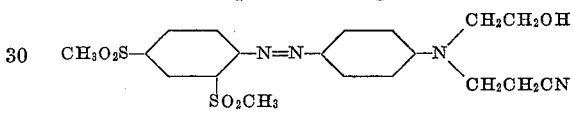

3. The azo compound having the formula:

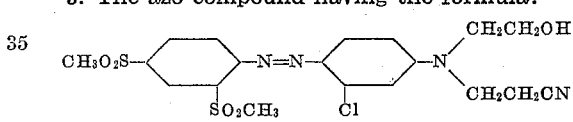

4. The azo compound having the formula:

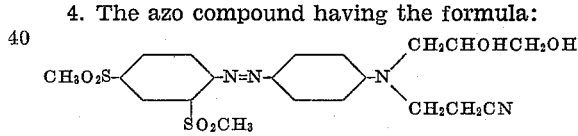

5. The azo compound having the formula:

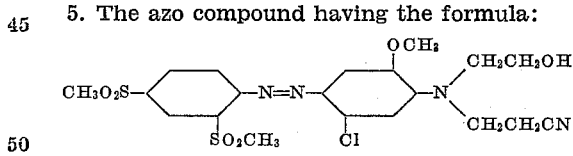

6. The azo compound having the formula:

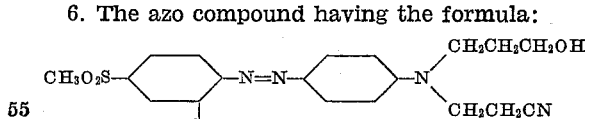

JOSEPH B. DICKEY.
GEORGE J. TAYLOR.

References Cited in the file of this patent

UNITED STATES PATENTS

| Number | Name | Date |
|---|---|---|
| 2,082,156 | Felix et al. | June 1, 1937 |
| 2,147,338 | Felix et al. | Feb. 14, 1939 |
| 2,156,446 | Bock | May 2, 1939 |
| 2,492,971 | Dickey | Jan. 3, 1950 |